United States Patent [19]
Iwasa et al.

[11] Patent Number: 5,803,131
[45] Date of Patent: Sep. 8, 1998

[54] FUEL FILLER PIPE

[75] Inventors: Tadanobu Iwasa, Ichinomiya; Masayuki Goto, Ogaki; Masayuki Nakagawa, Iwakura; Yasuhiko Ogisu, Nagoya; Toshiya Uemura, Tsushima, all of Japan

[73] Assignee: Toyoda Gosei Co., Ltd., Aichi-ken, Japan

[21] Appl. No.: 531,696

[22] Filed: Sep. 21, 1995

[30] Foreign Application Priority Data

| Sep. 26, 1994 | [JP] | Japan | 6-229586 |
| Sep. 26, 1994 | [JP] | Japan | 6-229587 |
| Mar. 27, 1995 | [JP] | Japan | 7-068318 |

[51] Int. Cl.$^6$ ................................................ F16L 11/00
[52] U.S. Cl. ...................... 138/137; 138/140; 138/141; 138/174
[58] Field of Search ....................... 138/137, 140, 138/141, 142, 143, 145, 146, 174; 428/36, 91

[56] References Cited

U.S. PATENT DOCUMENTS

| 5,023,115 | 6/1991 | Mizuhashi | 428/35.8 X |
| 5,472,754 | 12/1995 | Douchet et al. | 138/141 X |
| 5,476,121 | 12/1995 | Yoshikawa et al. | 138/145 X |

OTHER PUBLICATIONS

Japanese Abstract of 62–91317, Apr. 25, 1987, Toshiki Kondo.

Japanese Abstract of 62–79602, Oct. 4, 1994.

*Primary Examiner*—Patrick F. Brinson
*Attorney, Agent, or Firm*—Cushman Darby & Cushman IP Group of Pillsbury Madison & Sutro LLP

[57] ABSTRACT

A fuel additive pipe 11 comprised of a pipe main body 12 and a plating layer 13 formed on the external or interior wall surface of the pipe main body 12 and composed of an electroless plating layer 131 and an electroplating layer 132. The pipe main body 12 contains a high-density polyethylene as a base material and an additive 21 such as mica. While the pipe main body 12 is subjected to an etching treatment, the additive 21 does not dissolve in the etching solution, so that the additive 21 protrudes from the surface of the pipe main body 12. The thus protruding additive 21 serves as the starting point for forming the electroless plating layer 131 and promotes growth of the layer 131. This electroless plating layer 131 is firmly bonded with the pipe main body 12 by chemical absorption to the additive 21 from which inactive sites are removed by the etching treatment as well as by the physical absorption to the fine roughness formed by the etching treatment on the surface of the pipe main body 12.

18 Claims, 6 Drawing Sheets

FUEL FILLER PIPE

BACKGROUND OF THE INVENTION

1. Field of the Invention

The present invention relates generally to a fuel filler pipe for connecting a fueling port and a fuel tank in a vehicle, more particularly to a polyolefin-based fuel filler pipe having a plating layer.

2. Description of the Related Art

Generally, the fueling port and the fuel tank in a vehicle have been connected by a metal-based fuel filler pipe, for example, iron. Because the fuel filler pipe interposed between the fuel port and the fuel tank is filled with a fuel vapor, when gasoline flows in the pipe or when gasoline vapor expands with external temperature rise during refueling, it is necessary to prevent fuel vapors from permeating through the pipe wall and leaking to the atmosphere. In recent years, when environmental regulations are becoming strict, escape of fuel vapors must be controlled. In this regard, metallic fuel filler pipes exhibit excellent characteristics.

However, lighter automotive parts are demanded these days, and it is attempted to use synthetic resin materials which are lighter than the metallic materials, for example, a high-density polyethylene (HDPE) as the base material of the pipe. However, a synthetic resin material originally has high gasoline permeability, and when such synthetic resin material is used alone for such a purpose, the gasoline vapor is liable to permeate through the pipe to the outside.

Therefore, it was proposed to control such permeation of the gasoline vapor by forming a plating layer on the surface of the resin-based pipe.

However, polyolefin resin materials, such as HDPE, have a relatively low polarity compared with common resin materials. Accordingly, if a polyolefin resin material is subjected to an etching treatment and then to a plating treatment, no plating layer can be formed. Even if a plating layer is formed, that plating layer will easily separate from the resin material due to its weak chemical absorptivity against the resin material.

Thus, there are known the following two prior art techniques which relate to such plating problems.

A first prior art technique is to use an HDPE base material incorporated with a granular calcium carbonate additive. In this technique, the base material is etched with a strong acid so as to dissolve the calcium carbonate granules exposed partly on the surface of the base material and to form pot-like pits in which a plating layer starts to grow. The plating layer does not separate easily because it is physically absorbed or anchored in the pot-like pits.

However, the calcium carbonate used as the additive is nothing but an extending agent and has no reinforcing effect against HDPE. Accordingly, physical properties of the pipe including mechanical strength are notably lowered with the increase in the amount of calcium carbonate loaded. Further, this prior art technique develops bond strength of the plating layer against the base material by providing physical association between the pot-like pits and the plating material. Accordingly, adhesion strength of the plating layer against the base material is not necessarily sufficient. Besides, since the calcium carbonate granules dissolve in the etching solution in this prior art technique, composition of the etching solution is changed, so that the solution needs special maintenance.

As a second prior art technique, there is known a method in which the surface of the HDPE base material is modified by subjecting it to a plasma treatment or a corona treatment, prior to the plating treatment. In this method, the plating layer can be absorbed chemically on the base material by the plasma or corona treatment which imparts polarity to the base material surface.

However, large-scaled equipment is required for accomplishing the plasma treatment, and it is difficult to carry out a plasma treatment continuously because of its intricate treatment procedures. Consequently, it is difficult to improve working efficiency and production efficiency. Further, the step of plating the base material having been subjected to the surface modifying treatment includes substeps such as degreasing and etching. Accordingly, if the etching treatment is applied, particularly to the surface-modified base material, the thus modified effect on the surface of the base material is lowered.

SUMMARY OF THE INVENTION

Accordingly, it is a primary objective of the present invention to provide a fuel filler pipe which has an extremely reduced weight, compared with metal pipes, and which exhibits excellent characteristics of preventing fuel vapor permeation from occurring.

It is another objective of the present invention to improve adhesion strength of a plating layer against the base material of the fuel filler pipe without deteriorating the physical properties of the pipe.

It is still another objective of the present invention to continuously and securely form a plating layer using relatively simple apparatus in applying the plating treatment to the base material of a fuel filler pipe based on a polyolefin resin having low surface polarity.

To achieve the foregoing and other objects, and in accordance with the purpose of the present invention, a pipe is provided. The pipe for connecting a fuel tank with a fuel source to supply fuel to a tank comprises a pipe body which is substantially made of polyolefin resin. The body includes an inner wall and an outer wall, with a plating layer formed on at least one of those walls. The pipe construction reinforces the bond between the plating layer and the associated wall.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

DETAILED DESCRIPTION OF THE PREFERRED EMBODIMENT

A first embodiment of the present invention will be described below referring to FIGS. 1 to 5.

Figure 1:
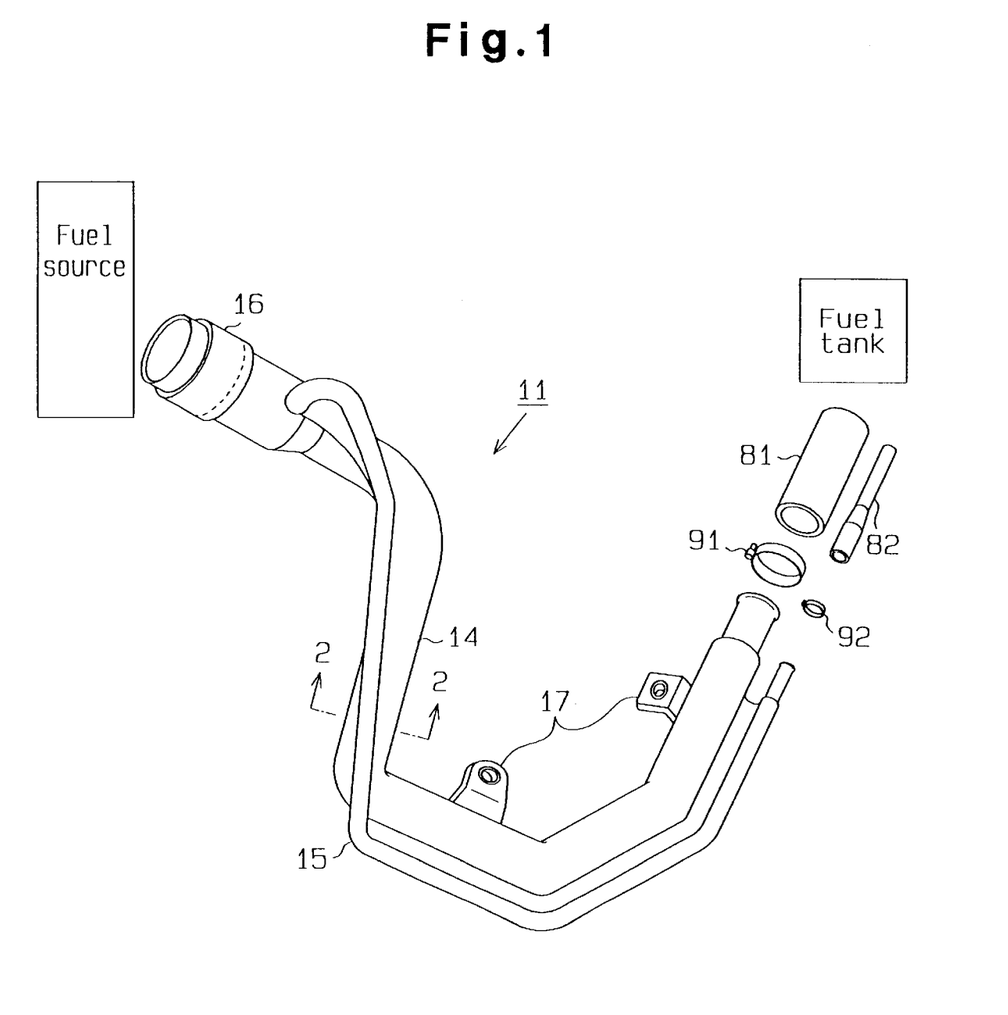
FIG. 1 is an exploded perspective view of a fuel filler pipe according to the invention.

The fuel filler pipe, generally referenced at 11, connects a fueling port (not shown) and a fuel tank (not shown) in a vehicle (not shown). The fuel pipe 11 comprises a tubular fueling pipe 14, for introducing a gasoline poured through the fueling port to the fuel tank, and a return pipe 15, which is connected to an upper position of the fuel tank, for releasing gas in the tank during refueling. A metal retainer 16 is fitted to that end of fueling pipe 14 which is connected to the fueling port, with mounting flanges 17 being formed integrally with the pipe 14 in the middle. Flanges 17 are used for securing pipe 11 to the main body of the vehicle (not shown). Further, rubber hoses 81, 82 are fastened to the opposite end portion of the fueling pipe 14 which is connected to the fuel tank, and one end portion of the return pipe 15 by clamps 91, 92, respectively. Accordingly, the pipe 11 can be attached readily to the fuel tank.

Figure 2:
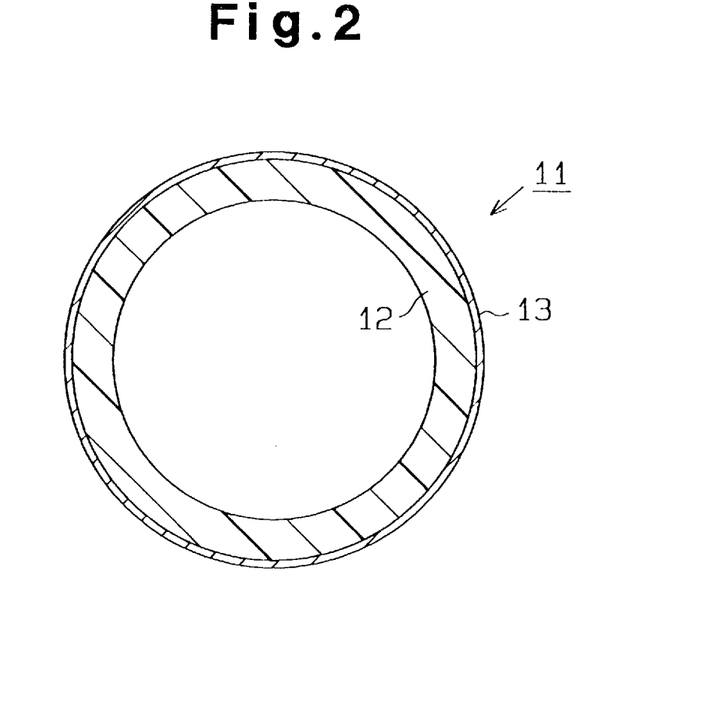
FIG. 2 is a cross-sectional view taken along the line 2—2 in FIG. 1.
Figure 3:
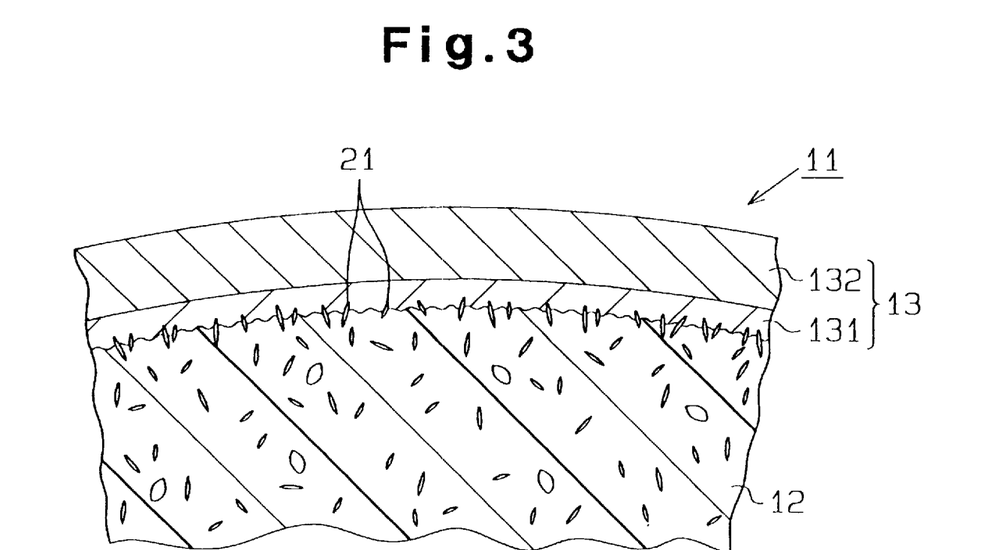
FIG. 3 shows schematically a partially enlarged cross-section of the cross-sectional view shown in FIG. 2.

Fueling pipe 14 and return pipe 15 each have the same construction comprising a pipe main body 12, as the base material, and a plating layer 13 formed on an external wall surface of the pipe main body 12, as shown in FIG. 2. The pipe main body 12 is molded using a high density polyethylene (HDPE) as the base material, for example, by means of well-known blow molding techniques. The HDPE is incorporated with a predetermined amount of platelet-like talc or scaly mica as an additive 21, e.g., in an amount of at least 5% by weight in this embodiment, as shown in FIG. 3.

Next, a process for producing the fuel filler pipe 11 according to this embodiment will be described.

First, the pipe main body 12 is molded by means of well known blow molding techniques. More specifically, HDPE incorporated with the additive 21 is extruded from an extruder to form a hollow pipe, and air is then blown into the thus extruded hollow pipe which has been placed in a pair of molding dies to complete the molding of a desired hollow pipe main body shape.

Subsequently, in a cleaning step, smudge and soil including grease, debris, or other contaminants, deposited on the pipe main body 12 are removed. More specifically, the pipe main body 12 is immersed in an aqueous solution containing 80 g/l of sulfuric acid and 10 g/l of a surfactant at 60° C. for 125 seconds to remove fats adhered on the surface of the pipe main body 12.

Then, in an etching step, fine roughness is formed on the surface of the pipe main body 12 so as to enhance adhesion of the plating film to be formed thereon. More specifically, the pipe main body 12 is immersed in an etching solution containing 380 g/l of sulfuric acid, 420 g/l of chromium (VI) and 40 g/l of chromium (III) at 65° C. for 604 seconds.

Figure 4:
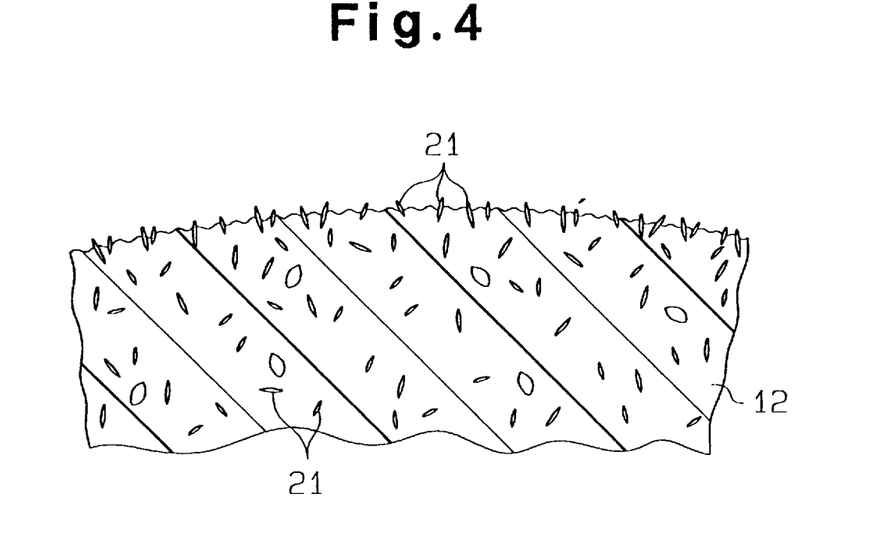
FIG. 4 is a schematic view of the state on the surface of a pipe main body subjected to an etching treatment.

The state or condition of the surface of pipe main body 12 subjected to the etching treatment will be described referring to FIG. 4. As shown in FIG. 4, a number of fine protrusions and recesses are formed on the etched surface of the pipe main body 12. However, since the additive 21 does not have solubility in the etching solution, it remains undissolved even when contacted directly with the etching solution, while the HDPE is dissolved by the etching solution. Thus, as shown in FIG. 4, the additive 21 will become exposed on the surface of the pipe main body 12. Further, since inactive sites on the surface layer of the additive 21, such as oxide film, are removed by this etching treatment, the exposed additive 21 comes to have high purity and a highly reactive surface.

Subsequently, in a first neutralizing step, the etching solution, such as acid remaining on the surface of the pipe main body 12, is neutralized. More specifically, the pipe main body 12 is immersed in an aqueous solution containing 60 ml/l of hydrochloric acid and 8 ml of a chromic acid neutralizer for 60 seconds.

Next, in a catalyst applying step, catalyst nuclei are formed on the surface of the pipe main body 12. The catalyst applying step in this embodiment is further divided into first and second substeps. In the first substep, the pipe main body 12 subjected to the first neutralizing step is immersed in an aqueous solution containing 180 ml/l of sulfuric acid and 30 ml/l of a catalyst nuclei forming agent at 34° C. for 215 seconds. A palladium/tim (Pd/Sn) complex compound is absorbed on the surface of the pipe main body 12, particularly in the fine recesses formed by the etching treatment and at the exposed additive 21. In the second substep, the pipe main body 12 subjected to the first substep is immersed in an aqueous solution containing 100 ml/l of sulfuric acid and 2 g/l of hydrazine sulfate at 45° C. for 208 seconds. Thus, tin in the Pd/Sn complex compound is removed to leave metal palladium as catalyst nuclei.

Subsequently, in an electroless plating step, the pipe main body 12 is subjected to an electroless plating treatment using, for example, nickel. More specifically, the pipe main body 12 is immersed in an aqueous solution containing 6 g/l of metal nickel, 18 g/l of sodium hypophosphite, 60 g/l of sodium phosphite and 30 g/l of nickel sulfate at 33° C. for 553 seconds which forms an electroless nickel plating layer 131 on main body 12.

Figure 5:
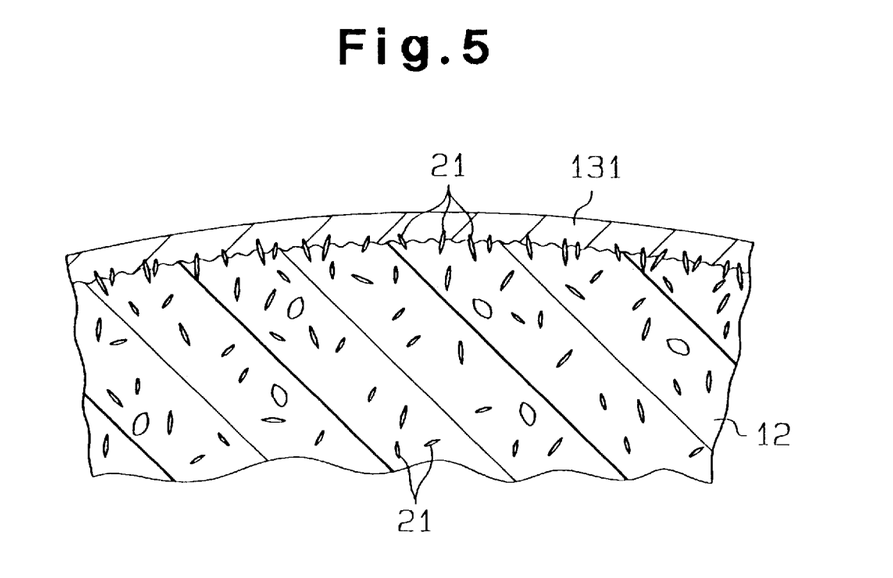
FIG. 5 is a schematic view of the state on the surface of the pipe main body on which an electroless plating layer is formed.

The state of the surface of the pipe main body 12, having the electroless nickel plating layer 131, can be understood with reference to FIG. 5. The fine roughness formed on the surface of the pipe main body 12 and the additive 21 protruding from that surface promote growth of the electroless plating layer 131. The electroless plating layer 131 is physically absorbed in the fine recesses present on the surface of the pipe main body 12 and is firmly bonded to the pipe main body 12. It is surmised that the electroless plating layer 131 also forms a chemical bond with the additive 21 protruding from the surface of the pipe main body 12 without any inactive sites. Accordingly, the electroless plating layer 131 can be bonded with the pipe main body 12 more firmly by the physical absorption within the fine recesses formed on the surface of the pipe main body 12 and also be the chemical absorption to the additive 21.

Finally, in an electroplating step, the pipe main body 12 that underwent the electroless plating step is subjected to an electroplating treatment using plating solutions employed for forming various metal plating constituting an electroplating layer 132 shown in FIG. 3. The undermost layer of the electroplating layer 132 is formed by striking using a plating solution containing 250 g/l of nickel sulphate, 30 g/l of nickel chloride and 30 g/l of boric acid. A copper plating layer is formed using a plating solution containing 200 g/l of copper sulfate, 50 g/l of sulfuric acid, 0.01 g/l of hydrochloric acid and a trace of a brightening agent. A semigloss nickel plating layer is formed using a plating solution containing 280 g/l of nickel sulfate, 45 g/l of nickel chloride, 40 g/l of boric acid and a trace of brightening agent. A gloss nickel plating layer is formed using a plating solution containing 240 g/l of nickel sulfate, 45 g/l of nickel chloride, 30 g/l of boric acid and a trace of brightening agent and additives. A chromium plating layer is formed using a plating solution containing 250 g/l of chromic anhydride, 10 g/l of sodium silicofluoride and 1 g/l of sulfuric acid.

In the electroplating treatment, the pipe main body 12 together with the electroless plating layer 131 thereon is immersed successively in the plating solutions and charged for a predetermined time, respectively. Accordingly, the strike plating layer, the copper plating layer, the semigloss nickel plating layer, the gloss nickel plating layer and the chromium plating layer are formed successively on the surface of the pipe main body 12 to collectively constitute the electroplating layer 132. Thus, a plating layer 13, composed of the electroless plating layer 131 and the electroplating layer 132, is formed on the surface of the pipe main body 12, and the thus treated pipe main body 12 is post-treated, e.g., washed with water, to provide a fuel filler pipe 11 having a plating layer 13 formed on the surface.

According to the constitution of this embodiment, by applying the etching treatment, the additive 21 which is contained in the pipe main body 12 is allowed to protrude from the surface of the pipe main body 12 and also inactive sites of the thus exposed additive 21 are removed. Accordingly, the electroless plating layer 131 can be absorbed chemically onto the pipe main body 12 via the additive 21. Consequently, the electroless plating layer 131 and the pipe main body 12 are firmly bonded to each other by chemical absorption as well as by physical absorption via the fine recesses formed on the surface of the pipe main body 12. Further, the thus achieved firm bondage between the electroless plating layer 131 and the pipe main body 12 improves adhesion strength of the plating layer 13 to the pipe main body 12.

Here, bond strength between the pipe main body 12 and the plating layer 13, specifically of electroless plating layer 131, was tested in a comparison between prior art examples using calcium carbonate as an additive and examples according to this embodiment using talc or mica as the additive. The test results will now be described.

In this test, calcium carbonate, talc and mica having various particle sizes, as shown in Table 1, were incorporated as additives into HDPE, and plating layers were formed in the same manner as described above, respectively. In Table 1, particle size means average particle size, and the unit of loading is "% by weight". Meanwhile, adhesion strength was measured in accordance with JIS H8630 under the following conditions: peeling width—10 mm, peeling speed—30 mm/min, and peeling angle=90°.

As shown in Table 1, in the case where a predetermined amount of platelet-like talc or scaly mica having a predetermined particle size is added, an adhesion strength can be obtained that is equal to or higher than the level achieved by incorporation of calcium carbonate. It should be noted here that an adhesion strength of 900 N/m or more causes no problem in practical uses, and an adhesion strength of 1500 N/m or higher is preferred because it exceeds the maximum adhesion strength of 1260 N/m achieved by incorporation of calcium carbonate.

Accordingly, in order to achieve an adhesion strength of 1500 N/m or more, it can be appreciated from the results shown in Table 1 that the platelet-like talc should have an average

TABLE 1

| | Classification | Shape | Particle size μm | Trade name | Component | Loadings | Adhesion strength N/m |
|---|---|---|---|---|---|---|---|
| 1 | Calcium carbonate | Granular | 1.8 | LITON A | $CaCO_3$ | 5 | 920 |
| 2 | Calcium carbonate | Granular | 1.8 | LITON A | $CaCO_3$ | 10 | 1260 |
| 3 | Calcium carbonate | Granular | 4 | WHITON P30 | $CaCO_3$ | 5 | 880 |
| 4 | Calcium carbonate | Granular | 4 | WHITON P30 | $CaCO_3$ | 10 | 1020 |
| 5 | Talc | Platelet-like | 1.45 | LM5300 | $SiO_2$, MgO | 5 | 1360 |
| 6 | Talc | Platelet-like | 1.45 | LM5300 | $SiO_3$, MgO | 10 | 1470 |
| 7 | Talc | Platelet-like | 1.8 | LMRiOO | $SiO_2$, MgO | 5 | 1630 |
| 8 | Talc | Platelet-like | 1.8 | LMRiOO | $SiO_2$, Mgo | 1C | 2120 |
| 9 | Talc | Platelet-like | 1.9 | LMSiOO | $SiO_2$, MgO | 5 | liio |
| 10 | Talc | Platelet-like | 1.9 | LMSiOO | $SiO_2$, MgO | 10 | 1620 |
| li | Talc | Platelet-like | 4.25 | LMP | $SiO_2$, MgO | 5 | 900 |
| 12 | Talc | Platelet-like | 4.25 | LMP | $SiO_2$, MgO | 10 | 1520 |
| 13 | Talc | Platelet-like | 5.5 | PK-50 | $SiO_2$, MgO | 5 | 1190 |
| 14 | Talc | Platelet-like | 5.5 | PK-50 | $SiO_2$, MgO | 1o | 1750 |
| 15 | Mica | Scaly | 2.8 | A-11 | $SiO_2$, $Al_2O_3$ etc. | 5 | 980 |
| 16 | Mica | Scaly | 2.8 | A-11 | $SiO_2$, $Al_2O_3$ etc. | 10 | 1020 |
| 17 | Mica | Scaly | 4.7 | A-21 | $SiO_2$, $Al_2O_3$ etc. | 3 | 1120 |

TABLE 1-continued

| Classi-fication | Shape | Particle size μm | Trade name | Component | Load-ings | Adhesion strength N/m |
|---|---|---|---|---|---|---|
| 18 Mica | Scaly | 4.7 | A-21 | $SiO_2$, $Al_2O_3$ etc. | 5 | 1820 |
| 19 Mica | Scaly | 4.7 | A-21 | $SiO_2$, $Al_2O_3$ etc. | 10 | 2130 |
| 20 Mica | Scaly | 9.6 | A-31 | $SiO_2$, $Al_2O_3$ etc. | 3 | 1160 |
| 21 Mica | Scaly | 9.6 | A-31 | $SiO_2$, $Al_2O_3$ etc. | 5 | 1730 |
| 22 Mica | Scaly | 17 | A-325 | $SiO_2$, $Al_2O_3$ etc. | 3 | 1270 |
| 23 Mica | Scaly | 17 | A-325 | $SiO_2$, $Al_2O_3$ etc. | 5 | 1580 |
| 24 Mica | Scaly | 20.5 | A-41 | $SiO_2$, $Al_2O_3$ etc. | 3 | 990 |
| 25 Mica | Scaly | 20.5 | A-41 | $SiO_2$, $Al_2O_3$ etc. | 5 | 1030 |
| 26 Mica | Needle-like | 0.3–1.0 | TOFICA-Y | $SiO_2$, $Al_2O_3$ etc. | 5 | 680 |
| 27 Mica | Needle-like | | | $SiO_2$, $Al_2O_3$ etc. | 10 | 1280 |

Manufacturers of the fillers:
LITON: Shiraishi Calcium Kabushiki-Kaisha
WHITON P30: Shiraishi Kogyo Kabushiki-Kaisha
Talcs: Fuji Talc Kabushiki-Kaisha
Scaly mica: Yaniaguchi Ummo Kabushiki-Kaisha
TOFICAY: Ohtsuka Kabuku Kabushiki-Kaisha
The particle *size of TOFICA-Y means a needle diameter.

particle size of greater than 1.45 μm and it should be added in an amount of more than 5% by weight; whereas the scaly mica should have an average particle size of greater than 2.8 μm and smaller than 20.5 μm, and it should be added in an amount of more than 3% by weight. The upper limit of the loading of the additive 21 is 20% by weight. In other words, if the additive 21 is added in an amount of more than 20% by weight, the adhesion strength cannot be increased any further, and besides strength of the molded pipe is lowered.

In this embodiment, since talc or mica, for a reinforcing function, was employed as the additive 21, incorporation of such additive 21 into HDPE causes no notable drop in the mechanical properties of the pipe main body 12. Further, since the additive 21 has a platelet-like or scaly form, contact area with HDPE and electroless plating layer 131, per weight of the additive 21 is incorporated, can be increased. Accordingly, even if the additive 21 is incorporated in a small amount, sufficient bond strength can be secured between the electroless plating layer 131 and the pipe main body 12, and also deterioration in the mechanical properties of the pipe main body 12 which can occur with the increase in the amount of the additive 21 to be incorporated can be prevented.

Further, HDPE, which is a thermoplastic resin material, is used as a raw material of the pipe main body 12. Since HDPE itself has a relatively high cohesion, the additive 21 can be retained firmly in the HDPE. Accordingly, reduction in the bond strength of the electroless plating layer 131 against the pipe main body 12 to be caused by slipping off of the additive 21 protruding from the surface of the pipe main body 12 can be securely prevented.

Meanwhile, if the pipe main body is immersed in an etching solution in the etching step, the additive 21 employed according to this embodiment does not dissolve into the etching solution. Accordingly, unlike the case where a prior art additive is employed, the composition of the etching solution remains unchanged, facilitating maintenance of the etching solution.

Further, collateral effects of this embodiment will now be described. A metal retainer 16, as in FIG. 1, is attached to that end portion of the fueling pipe 14 adjacent the fueling port, and the plating layer 13 is brought into contact with the retainer 16. Further, flanges 17 for securing the pipe 11 onto the main body of the vehicle are formed integrally with the pipe main body 12, so that the plating layer 13 is also brought into contact with the main body of the vehicle via the flanges 17. Thus, the retainer 16 and the plating layer 13 and the main body of the vehicle assume electrical continuity, respectively. Accordingly, not only electrification of the fuel filler pipe 11 but also sparking concomitant to the electrification can be securely prevented from occurring.

Further, the completed pipe 11, produced through the respective steps described above, is extremely light compared with the metallic fuel filler pipes, and use of the pipe 11 will reduce vehicle weight. Since the plating layer 13 is formed on the pipe main body 12 of the fueling pipe 14 and that of the return pipe 15, a fuel such as gasoline flowing through the pipe main body 12 is prevented from permeating through the wall of the pipe 11 and leaking to the atmosphere. Because the electroplating layer 132 is designed to be formed on the electroless plating layer 131 in this embodiment, the plating layer 13 as a whole assumes a thick and dense film to prevent permeation of the fuel, such as gasoline, therethrough.

Figure 6:
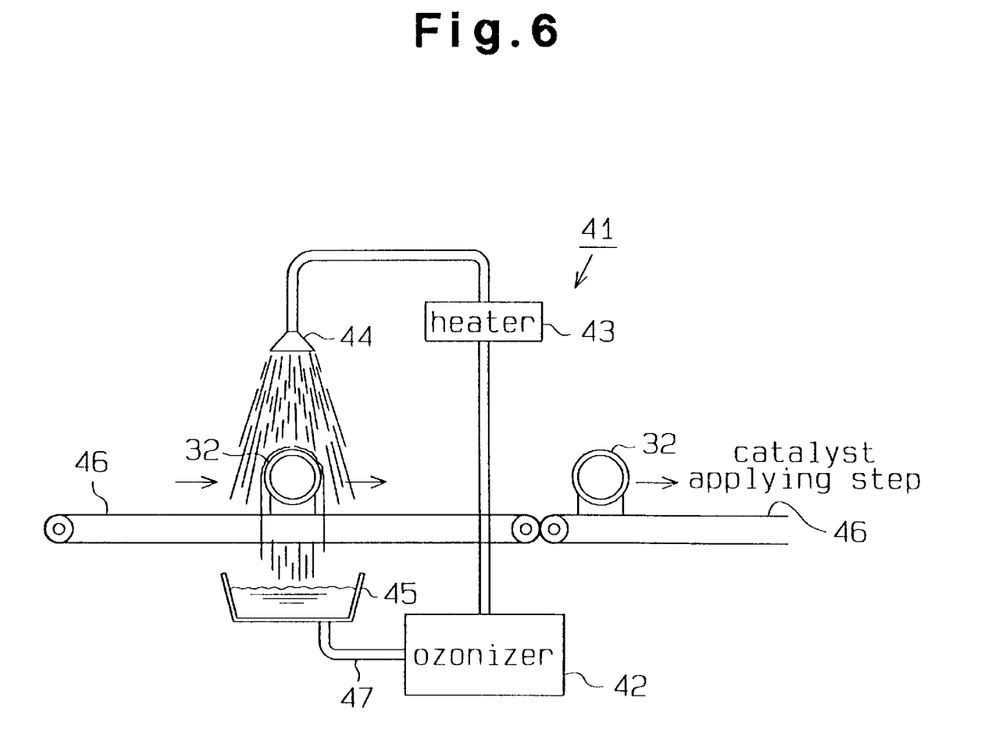
FIG. 6 diagrammatically shows a surface modifying apparatus employed according to a second embodiment.

Next, a second embodiment of the present invention will be described referring to FIGS. 6 to 9. A fuel filler pipe 31, as indicated in FIG. 6, that is produced according to this embodiment, is different from the fuel filler pipe 11 of the first embodiment. The pipe main body 32 of filler pipe 31 is subjected to a surface modifying treatment to improve the bond strength of the plating layer 13 against the pipe main body 32. Meanwhile, since the basic structure of the fuel filler pipe 31 according to this second embodiment is the same as that of the fuel filler pipe 11 according to the first embodiment, the similar constituents are affixed with the same reference numbers respectively and description is omitted. Accordingly, only differences will be described.

The pipe main body 32 of the second embodiment differs from the pipe main body 12 of the first embodiment in that the main body 32 is not incorporated with an additive 21.

Next, a process for producing the pipe 31 according to this second embodiment will be described.

As described above for the first embodiment, the pipe main body 32 is molded by means of blow molding, and the thus molded pipe main body 32 is subjected to a cleaning step, an etching step and a first neutralizing step. Then, the pipe main body 32 underwent a first neutralizing treatment. This first neutralizing step, a surface modifying step, is the essential feature of the second embodiment.

In this surface modifying step, the pipe main body 32 is subjected to a surface modifying treatment using a surface modifying apparatus 41 as shown schematically in FIG. 6.

The surface modifying apparatus 41 is provided with an ozonizer 42, a heater 43, a spray nozzle 44, a drain 45 and hoses interconnecting these members into a circulation system including a suitable pump (not shown). The ozonizer 42 and the spray nozzle 44, as well as the ozonizer 42 and the drain 45 are connected to each other via pipes or hoses, respectively. Meanwhile, the heater 43 is, for example, disposed between ozonizer 42 and the spray nozzle 44. The heater 43 will heat an aqueous ozone solution to a predetermined temperature.

Ozonizer 42 converts $O_2$ to $O_3$ and also allows the thus formed $O_3$ to dissolve in water to prepare an aqueous ozone solution, which is then pumped toward the heater 43 by an internal pump (not shown). The spray nozzle 44 sprays the aqueous ozone solution, heated by the heater 43, against the pipe main body 32. It is preferred that a relationship of $A \times B^{-2} \geq 0.07$ (N) is established between the spray pressure A (Pa) when the aqueous ozone solution is sprayed and the distance B (cm) between the tip of the spray nozzle 44 and the pipe main body 32.

The drain 45, which is disposed below a conveyor 46 for transporting the pipe main body 32, collects the aqueous ozone solution impinged upon the pipe main body 32. The aqueous ozone solution collected in the drain 45 is thereafter fed back through a connecting pipe 47 to ozonizer 42 at a constant rate.

Figure 7:
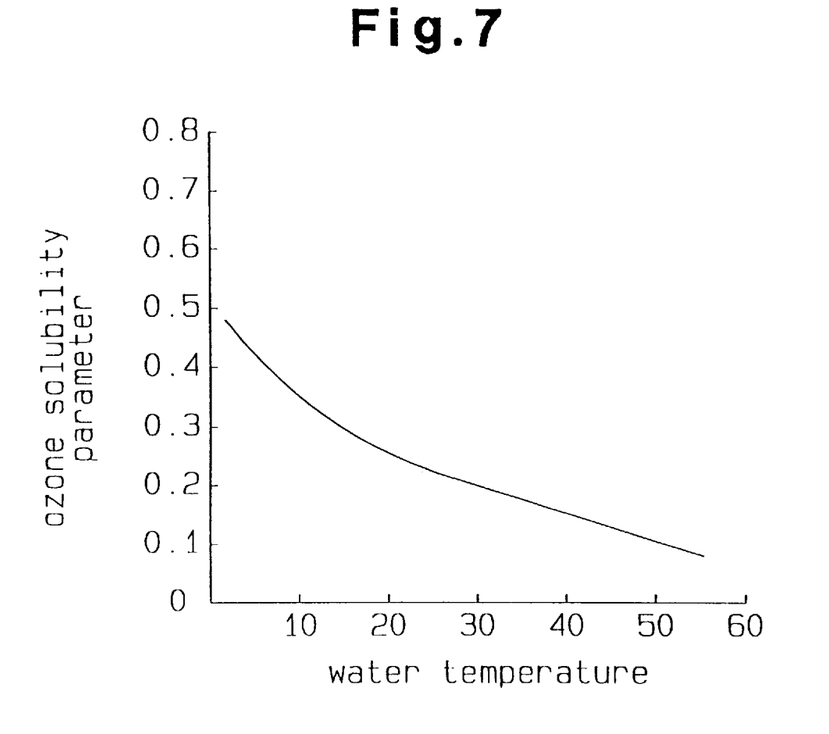
FIG. 7 is a graph showing a relationship between water temperature and solubility of ozone in water.

The relationship between water temperature and ozone solubility parameter will be described referring to the graph shown in FIG. 7. In FIG. 7, the vertical axis represents the ozone solubility parameter and the horizontal axis represents water temperature. It can be appreciated from the graph that the higher the water temperature is, the lower is the ozone solubility and the more easily ozone decomposes. On the other hand, it is generally known that the reaction speed (surface modifying rate) increases in the high water temperature region. Accordingly, the temperature of the aqueous ozone solution is desirably adjusted by heater 43 to be as high as possible provided that the highest possible ozone concentration is obtained. More specifically, the aqueous ozone solution is desirably heated to a temperature between and including about 65° C. and about 85° C. Further, the aqueous ozone solution desirably has a pH of 7 or less, because ozone in the aqueous ozone solution hardly decomposes under an acidic condition to maintain high ozone concentration.

The sequence of processing steps can begin by placing the pipe main body 32 on the conveyor 46 so body 32 can be moved toward the surface modifying apparatus 41. An aqueous ozone solution is sprayed through the spray nozzle 44 against the pipe main body 32 moving into the surface modifying apparatus 41. When the thus sprayed aqueous ozone solution is applied onto the pipe main body 32, the surface of the pipe main body 32 is oxidized and polarized by the oxidative effect of ozone contained in the aqueous ozone solution. Since the aqueous ozone solution is sprayed through the spray nozzle 44, it can be surely applied to the entire surface of the pipe main body 32 irrespective of the shape of the pipe main body 32 (shown in tubular form in this embodiment). Accordingly, an oxidation reaction takes place uniformly on the entire surface of the pipe main body 32 to minimize formation of reaction spots attributed to nonuniform oxidation reaction. In order to allow the oxidation reaction to take place more uniformly, the pipe main body 32 may be rotated using, for example, a rotary apparatus (not shown) during spraying of the aqueous ozone solution. This is a first neutralizing step.

In a second neutralizing step, the pipe main body 32 thus surface-modified is subjected to a second neutralizing treatment. More specifically, the pipe main body 32 which underwent the surface modifying treatment is immersed in an aqueous solution containing 30 ml/l of a cationic surfactant (containing an alkyltrimethylammonium chloride as the major component in this embodiment) and 30 ml/l of a surface tension inhibitor at 50° C. for 242 seconds. This second neutralization treatment not only achieves neutralization of the pipe main body 32 but also promotes absorption of a catalyst in the subsequent catalyst applying step.

Subsequent to the catalyst applying step, the electroless plating step and the electroplating step, as described referring to the first embodiment, are each performed to form a composite plating layer 13 composed of an electroless plating layer 131 and an electroplating layer 132 on the surface of the pipe main body 32.

Polar groups are attached to the surface of the pipe main body 32 in this embodiment by application of the surface modifying treatment. The fine recesses present on the surface of the pipe main body 32 are allowed to assume a condition such that a large amount of catalyst can be readily absorbed by applying the second neutralizing treatment. Accordingly, an electroless plating layer can be formed easily on a polyolefin resin (HDPE) pipe main body 32, which has been, in the past, believed to be a relatively difficult thing to accomplish, i.e., the forming of a plating layer thereon, thus enabling formation of a securely adhered plating layer 13.

As described above, the plating layer 13 thus formed securely can prevent a fuel, such as gasoline, from permeating through the HDPE pipe main body 32, which readily allowed permeation of the fuel if no plating layer is formed.

Figure 8:
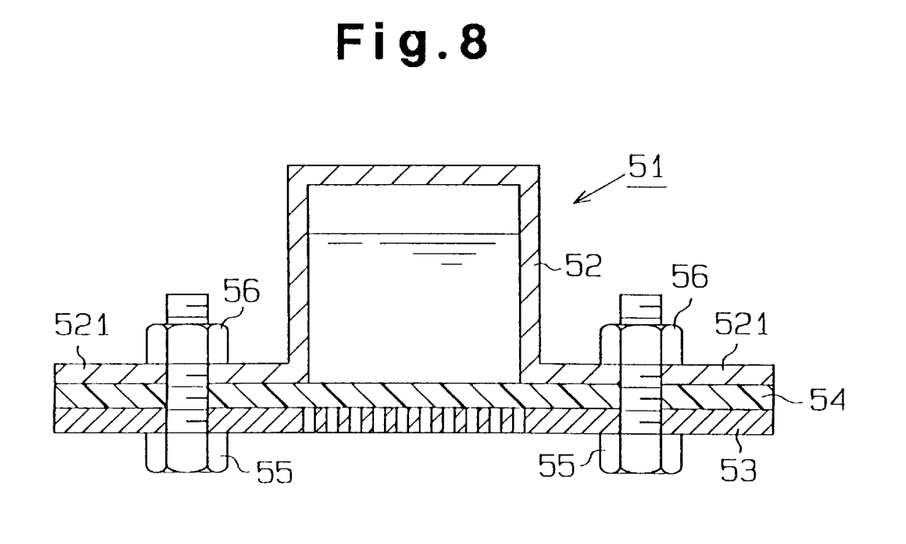
FIG. 8 is a cross-sectional view of a permeability tester employed when the amount of fuel permeated through a test piece is to be measured.

Tests measuring the amount of permeated fuel using a permeability tester shown in FIG. 8 for confirming the above effect will be described.

The permeability tester 51 is provided with a cup 52 having flange 521, and a porous plate 53. A test piece 54, e.g., a planar test piece of fuel filler pipe 31, is sandwiched between the cup 52 and the porous plate 53 which are fastened together with bolts 55 and nuts 56. The cup 52 contains a fuel (a mixture of gasoline containing 10% of MTBE/ethanol=9:1). The amount of the fuel permeated per unit area of the test piece 54 for a predetermined time, e.g., for 24 hours, was measured for the respective test pieces 24 as described below.

Figure 9:
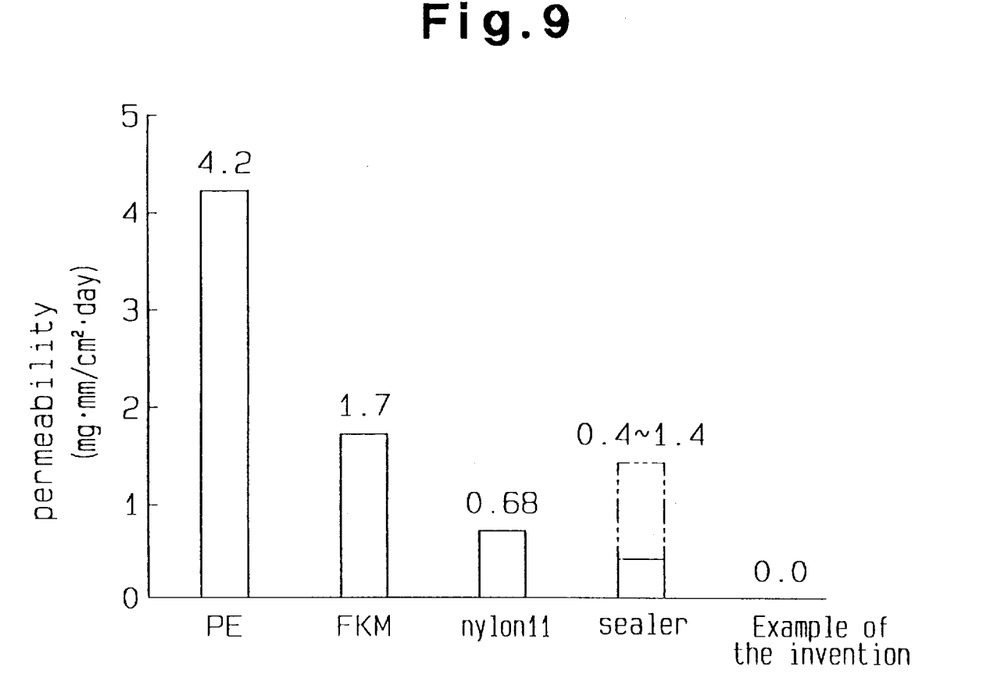
FIG. 9 is a graph showing amounts of fuel permeated through respective test pieces.

Measurement results are shown in the graph of FIG. 9 where the vertical axis represents the amount of permeated fuel per unit area for 24 hours, while the horizontal axis represents the test pieces, respectively. "PE" represents polyethylene, FKM" represents a fluororubber, and "sealer" represents HDPE in which leaflet-like Nylon is dispersed or oriented. As can be appreciated from this graph, the amount of fuel permeated through the test piece of this embodiment (HDPE base material+plating layer) was nil. Thus, it can be understood that according to the plating step of this embodiment, the plating layer 13 can be securely formed on the surface of the pipe main body 32, and further the fuel filler pipe 31 having the plating layer 13 formed thereon will prevent fuel from permeating therethrough.

Further, the surface modifying treatment applied on the surface of the pipe main body 32 according to this embodiment is carried out using a relatively simple surface modifying apparatus 41 and by spraying an aqueous ozone solution without interrupting a series of plating steps. Consequently, the fuel filler pipe 31 can be produced using simplified production procedures compared with the case where a conventional large, and complicated surface modifying apparatus, such as a plasma treatment apparatus, is used. Further, in the surface modifying apparatus employed according to this embodiment, unlike the conventional surface modifying apparatus in which the treatment must be carried out batchwise, the treatment can be performed continuously, so that production efficiency can be improved. Accordingly, the production cost of the fuel filler pipe 31 can be lowered, and also working efficiency can be improved.

In addition, since the aqueous ozone solution is sprayed through the spray nozzle onto the surface of the pipe main body 32, a considerable amount of ozone can be uniformly applied on the surface of the pipe main body 32 per unit time. Thus, the surface modifying treatment can be carried out securely in a brief time compared with the case where the pipe main body 32 is immersed in an aqueous ozone solution, thereby also leading to improving pipe manufacturing productivity.

In this embodiment, the retainers 16 and the plating layer 13, as well as the plating layer 13 and the main body of the vehicle, assume electrical continuity, respectively. Accordingly, not only electrification of the fuel filler pipe 31 but also sparking concomitant to the electrification can be securely prevented from occurring.

A fuel filler pipe 31 produced through the respective steps described above is also extremely light compared with the metallic fuel filler pipes, and use of the pipe 31 also reduces vehicle weight. Since the plating layer 13 is formed on the pipe main body 32, fuel is prevented from permeating through the wall of the pipe 31 and leaking to the atmosphere. Again, the electroplating layer 132 is designed to be formed on the electroless plating layer 131 in this embodiment, so that the plating layer 13 as a whole assumes a thick and dense film to prevent permeation of fuel, such as gasoline, therethrough.

Figure 10:
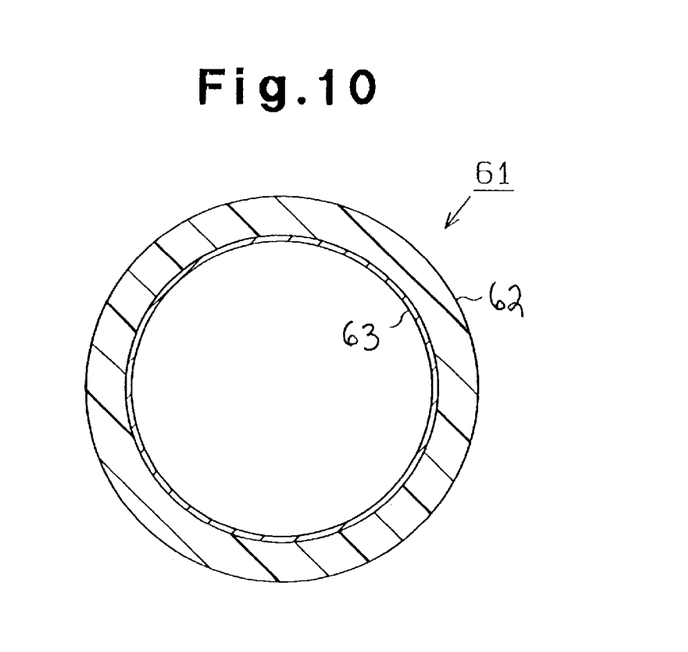
FIG. 10 shows schematically a partial cross-sectional view of a fuel filler pipe according to a third embodiment of the invention.

A third embodiment of the present invention is shown in FIG. 10. A fuel filler pipe 61 according to the third embodiment differs from the fuel filler pipes 11, 31 of the first and second embodiments in that the composite plating layer 63 is formed on the internal wall surface of the pipe main body 62. The process of forming plating layer 63 on the pipe main body 62 will be the same as a the procedure used in the first and second embodiments.

The fuel filler pipe 61 according to the third embodiment enjoys the following advantages in addition to those described in the second embodiment. More specifically, since the plating layer 63 is formed on the internal wall surface of the pipe main body 62, the plating layer 63 is prevented from being damaged or peeled off even when the pipe 61 is hit or struck by pebbles and the like during driving of the vehicle. Accordingly, the pipe 61 shows excellent antichipping properties, so that other parts or members such as mud guard for protecting the pipe 61 from the impingement of the pebbles can be omitted. As a result, cost reduction and reducing the weight of a vehicle can be achieved.

Although only three embodiments of the present invention have been described herein, it should be apparent to those skilled in the art that the present invention may be embodied in many other specific forms without departing from the spirit or scope of the invention. Particularly, it should be understood that the present invention may be embodied in the following manners:

(1) The shape, etc. of the fuel filler pipes 11, 31, 61 are not limited to those as described in the above embodiments but may be, for example, of a constitution having no return pipe 15, retainers 16 and flange 17.

(2) While HDPE is used as a base material polyolefin in the above embodiments, there may be used other polyolefins, i.e., common polyethylenes, low-density polyethylenes, polypropylenes, polyesters such as polyethylene terephthalate or other resins.

(3) While the pipe main bodies 12, 32 and 62 are molded by means of blowing, they may be formed by means of other molding methods, such as injection molding.

(4) While the plating layers 13 and 63 are composed of the electroless plating layer 131 and the electroplating layer 132 in the above embodiments, the plating layer 13 or 63 may not contain the electroplating layer 132. The kinds of plating layers, the thickness of each plating layer and the composition of each plating layer are not limited to those described in the above embodiments but can be changed depending on the purpose and application.

(5) The treating temperature, the treating time, the treating agents, etc. in the respective treatment steps in the above embodiments are given as mere examples and can be changed suitably depending on the object to be treated. While the catalyst applying step employs the first substep and the second substep, it may also employ a sensitizing substep and an activation substep. The sensitizing substep uses a sensitizer solution ($SnCl$, $2H_2O/36\%$ HCl=5–30 g/l: 5–30 ml/l), and the activation step uses an activator solution ($PbCl_2$/36% HCl=0.1–0.30 g/l:1–5 ml/l).

(6) While an aqueous ozone solution is sprayed onto the surface of the pipe main body 32 so as to apply ozone thereon in the second embodiment, other means may be employed so long as ozone can be uniformly applied onto the surface of the pipe main body 32. For example, the aqueous ozone solution may be allowed to cascade onto the pipe main body 32, or the pipe main body 32 may be put into a vessel containing an aqueous ozone solution.

(7) While an alkyltrimethylammonium chloride is used as the cationic surfactant in the second embodiment, it may be replaced with other surfactants, for example, polyoxyethylenealkylamine and alkyldimethylbenzylammonium chloride.

(8) While the pipe main body 32 is transported on the conveyor 46 in the surface modifying step in the second embodiment, the pipe main body 32 may be transported by other transportation means such as a hanger commonly employed in plating.

Therefore, the present examples and embodiments are to be considered as illustrative and not restrictive, and the invention is not to be limited to the details given herein, but may be modified within the scope of the appended claims.

What is claimed is:

1. A pipe for connecting a fuel tank with a fuel source to supply fuel to said tank, said pipe comprising:

a pipe body comprising a polyolefin resin, said pipe body including an inner wall and an outer wall; and a plating layer formed on and bonded to at least one of said inner and outer walls by a reinforced bond with said walls wherein said reinforced bond includes a portion oxidized by ozone on a surface of said wall etched by an etching solution;

said surface includes a portion activated by neutralization solution substantially comprising cation surfactant; and said plating layer includes an electroless plated portion on said surface.

2. The pipe as set forth in claim 1 wherein:

the reinforced bond is provided by a reinforcing additive mixed with said pipe body;

said reinforcing additive is insoluble in said etching solution so that said reinforcing additive remains in said surface; and said plating layer is connected with said reinforcing additive.

3. The pipe as set forth in claim 1, wherein said electroless plated portion is formed on the surface having a catalysis for a firm connection of the surface with the plating layer.

4. The pipe as set forth in claim 1 wherein said polyolefin resin includes a high density polyethylene.

5. A pipe for connecting a fuel tank with a fuel source to supply fuel to said tank, said pipe comprising:

a pipe body comprising a polyolefin resin, said pipe body including an inner wall and in outer wall; and a plating layer formed on and bonded to at least one of said inner and outer walls by a reinforced bond with said wall;

wherein the reinforcing bond is provided by a reinforcing additive mixed with said pipe body;

said wall has a surface etched by an etching solution;

said surface additive is insoluble in said etching solution so that said reinforcing additive remains in said surface; and said plating layer is connected with said reinforcing additive;

wherein said reinforcing additive has a shape selected from a group consisting of a flat plate and a fish scale.

6. The pipe as set forth in claim 5 wherein said reinforcing additive includes at least one of talc and mica.

7. The pipe as set forth in claim 5 wherein said pipe body includes at least 3% by weight of said reinforcing additive.

8. The pipe as set forth in claim 6 wherein said talc has an average diameter larger than 1.45 micrometer and wherein said pipe body includes 5 to 20% by weight of said talc.

9. The pipe as set forth in claim 6 wherein:

said reinforcing additive includes mica;

said mica has an average diameter between 2.8 through 20.5 micrometer; and said pipe body includes 3 to 20% by weight of said mica.

10. The pipe as set forth in claim 1 wherein:

the reinforced bond is provided by a reinforcing additive mixed with said pipe body;

said wall has a surface etched by an etching solution;

said reinforcing additive is insoluble in said etching solution so that said reinforcing additive remains in said surface; and said plating layer is connected with said reinforcing additive.

11. The pipe as set forth in claim 10 wherein said reinforcing additive has a shape selected from the group consisting of a flat plate and a fish scale.

12. The pipe as set forth in claim 11 wherein said reinforcing additive is at least one of talc and mica.

13. The pipe as set forth in claim 11 wherein said pipe body includes at least 3% by weight of said reinforcing additive.

14. The pipe as set forth in claim 12 wherein:

said reinforcing additive is talc;

said talc has an average diameter larger than 1.45 micrometer; and said pipe body includes 5–20% by weight of said talc.

15. The pipe as set forth in claim 12 wherein:

said reinforcing additive is mica;

said mica has an average diameter between 2.8 through 20.5 micrometer; and said pipe body includes 3 to 20% by weight of said mica.

16. The pipe as set forth in claim 5 wherein:

said reinforcing bond includes a portion oxidized by ozone on said surface;

said surface includes a portion activated by neutralization solution substantially comprising cation surfactant; and said plating layer includes an electroless plated portion on said surface.

17. The pipe as set forth in claim 16 wherein said electroless plated portion is formed on the surface having a catalysis for a firm connection of the surface with the plating layer.

18. The pipe as set forth in claim 5 wherein said polyolefin resin includes a high density polyethylene.

* * * * *